United States Patent
Tsai et al.

(10) Patent No.: US 11,683,777 B2
(45) Date of Patent: Jun. 20, 2023

(54) BASE STATION AND DATA UPLINK TRANSMISSION ABNORMAL DETECTION METHOD

(71) Applicant: INSTITUTE FOR INFORMATION INDUSTRY, Taipei (TW)

(72) Inventors: Yi-Hsueh Tsai, Taipei (TW); Ying-Tsun Ke, Taipei (TW); Shun-Ming Wang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 113 days.

(21) Appl. No.: 17/090,913

(22) Filed: Nov. 6, 2020

(65) Prior Publication Data
US 2022/0124663 A1  Apr. 21, 2022

(30) Foreign Application Priority Data
Oct. 19, 2020  (TW) .................. 109136180

(51) Int. Cl.
*H04W 48/04* (2009.01)
*H04W 64/00* (2009.01)
*H04W 84/04* (2009.01)

(52) U.S. Cl.
CPC .......... *H04W 64/00* (2013.01); *H04W 48/04* (2013.01); *H04W 84/045* (2013.01)

(58) Field of Classification Search
CPC ... H04L 63/107; H04L 63/08; H04L 63/0492; H04L 63/10; H04W 4/029; H04W 48/04;
(Continued)

(56) References Cited

U.S. PATENT DOCUMENTS 10,477,391 B1  11/2019  Verma et al.
2003/0217122 A1*  11/2003  Roese .................. G01S 5/02
                                                        709/219
(Continued)

FOREIGN PATENT DOCUMENTS

KR  10-2018-0086477 A  7/2018
WO  2020/068521 A1  4/2020

OTHER PUBLICATIONS

The office action of the corresponding Taiwanese application No. TW109136180 dated Sep. 13, 2021.
(Continued)

*Primary Examiner* — Lester G Kincaid
*Assistant Examiner* — Dung L Lam
(74) *Attorney, Agent, or Firm* — CKC & Partners Co., LLC (57) ABSTRACT

A base station is disclosed. The base station includes several radio devices and a core network device. The core network device is connected to the several radio devices and is configured to determine a first user location data corresponding to a user device according to a user uplink transmission data and several user location data, and to determine whether to allow the user device to perform a data uplink transmission operation or not according to the first user location data. The user uplink transmission data is uplink transmitted by the user device, and the several user location data are establish according to the several radio devices and several user locations. The several user location data include the first user location data.

14 Claims, 6 Drawing Sheets

400

| user location | radio device data | beam data | uplink transmission time offset data | allow data | mark data |
|---|---|---|---|---|---|
| UP1 | {1,2,3} | {m,n,p} | {x ms, y ms, z ms} | Accepted | |
| UP2 | {15,16,18,19} | {l,m,n,p} | {w ms, x ms, y ms, z ms} | Accepted | Temporary Rejected |
| UP3 | {10,11,12,15} | {l,m,n,p} | {l ms, m ms, n ms, o ms} | Gray | |
| UP4 | {4,5,6} | {q,r,s} | {w ms, x ms, y ms} | Rejected | |
| ... | ... | ... | ... | ... | ... |

(58) Field of Classification Search
CPC ............... H04W 64/00; H04W 84/045; Y10S 707/99939
See application file for complete search history.

(56) References Cited

U.S. PATENT DOCUMENTS

2010/0048172 A1* 2/2010 Karaoguz ............... H04W 4/02
455/411
2018/0279207 A1* 9/2018 Geng ...................... H04W 4/06

OTHER PUBLICATIONS

The Examination Report of the corresponding Korean application No. KR10-2020-0153925 dated Jul. 21, 2021.

* cited by examiner

| user location | radio device data | beam data | uplink transmission time offset data | allow data | mark data |
|---|---|---|---|---|---|
| UP1 | {1,2,3} | {m,n,p} | {x ms, y ms, z ms} | Accepted | |
| UP2 | {15,16,18,19} | {l,m,n,p} | {w ms, x ms, y ms, z ms} | Accepted | Temporary Rejected |
| UP3 | {10,11,12,15} | {l,m,n,p} | {l ms, m ms, n ms, o ms} | Gray | |
| UP4 | {4,5,6} | {q,r,s} | {w ms, x ms, y ms} | Rejected | |
| ... | ... | ... | ... | ... | ... |

BASE STATION AND DATA UPLINK TRANSMISSION ABNORMAL DETECTION METHOD

CROSS-REFERENCE TO RELATED APPLICATION

This application claims the priority benefit of TAIWAN Application serial no. 109136180, filed Oct. 19, 2020, the full disclosure of which is incorporated herein by reference.

BACKGROUND

Field of Invention

The invention relates to a base station and a data uplink transmission abnormal detection method. More particularly, the invention relates to a base station and a data uplink transmission abnormal detection method of setting secure access area.

Description of Related Art

When an enterprise wants to establish a 5G private network environment, it can be achieved by renting the 5G network of a telecom operator. Since the information of the enterprise needs to be kept confidential, it is necessary to deploy the Edge Computing (EC) platform on the enterprise network Medium. Since the edge computing of 5G private network is deployed in the security-level environment of the telecommunication computer room, it may be subject to threats such as physical intrusion of equipment and transmission network intrusion. Therefore, the 5G private network service system should provide a mutual authentication and authorization mechanism to ensure that only authorized user devices may use the 5G local area network group services. Without authentication and authorization, any unauthorized user devices can obtain 5G local area network group services, resulting in 5G local area network group services, and the 5G local area network group services is subject to the risk of service misappropriation and denial of service.

SUMMARY

An aspect of this disclosure is to provide a base station. The base station includes several radio devices and a core network device. The core network device is connected to the several radio devices and is configured to determine a first user location data corresponding to a user device according to a user uplink transmission data and several user location data, and to determine whether to allow the user device to perform a data uplink transmission operation or not according to the first user location data. The user uplink transmission data is uplink transmitted by the user device, and the several user location data are establish according to the several radio devices and several user locations. The several user location data comprise the first user location data.

Another aspect of this disclosure is to provide a data uplink transmission abnormal detection method. The method is suitable for a base station. The base station comprises a core network device and several radio devices, the method comprises the following operations: establishing, by a processor of the core network device, several user location data according to several radio devices and several user locations; determining, by the processor of the core network device, that a first user location data of the several user location data is corresponding to a user device, according to the several user location data and a user uplink transmission data uplinked by the user device; and determining, by the processor of the core network device, whether to allow the user device to perform a data uplink transmission operation or not according to the first user location data.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Figure 1:
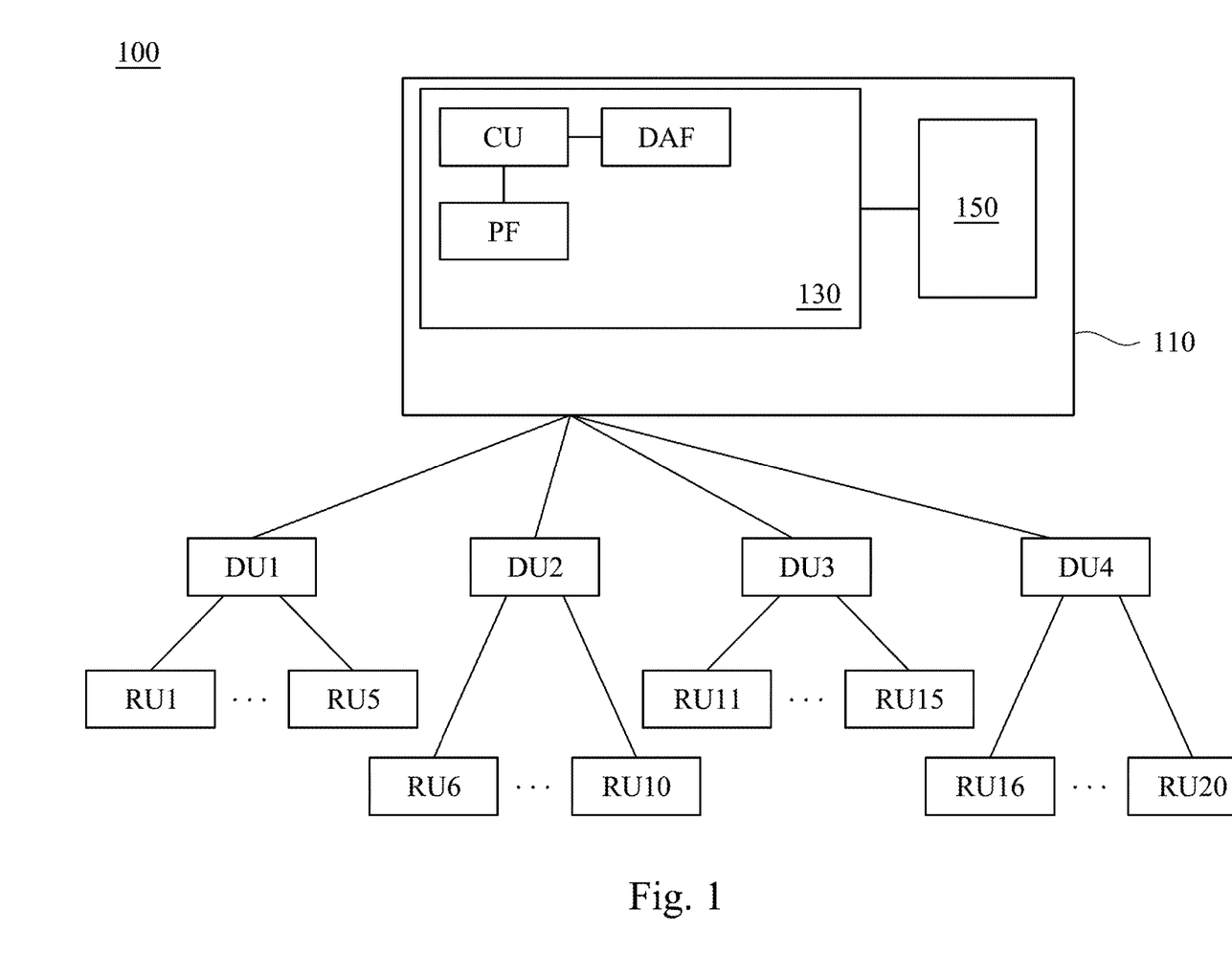
FIG. 1 is a schematic diagram illustrating a base station according to some embodiments of the present disclosure.

Reference is made to FIG. 1 is a schematic diagram illustrating a base station 100 according to some embodiments of the present disclosure. As illustrated in FIG. 1, the base station 100 includes the core network device 110, several distribution units DU1 to DU4 and several radio devices RU1 to RU20. The core network device 110 is connected to several distribution units DU1 to DU4, and each of the several distribution units DU1 to DU4 connects to part of the several radio devices RU1 to RU20. In some embodiments, the core network device 110, several distribution units DU1 to DU4 and several radio devices RU1 to RU20 are connected by physical network cable (such as fiber optic cable). Furthermore, in some embodiments, several distribution units DU1 to DU4 are located in the core network device 110.

The number of several distribution units DU1 to DU4 and the number of several radio devices RU1 to RU20 shown in FIG. 1 are for illustrative purposes only, and the embodiments of the present disclosure are not limited thereto.

As illustrated in FIG. 1, in some embodiments, the core network device 110 includes the processor 130 and the memory 150. The processor 130 is coupled to the memory 150. The processor 130 includes the centralized unit CU, the data analysis unit DAF and the filter unit PF. In the connection relationship, the centralized unit CU couples to the filter unit PF and the data analysis unit DAF respectively.

Figure 2:
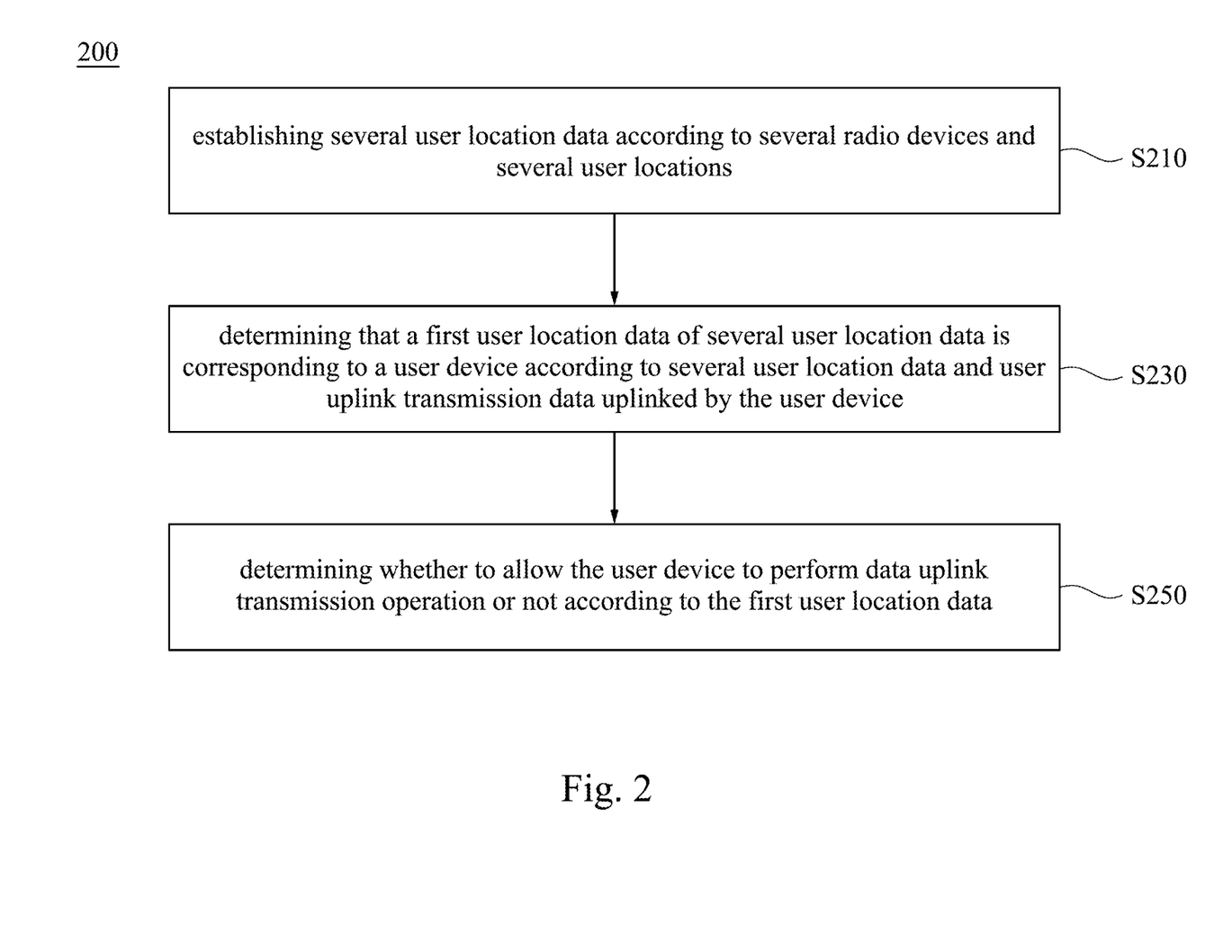
FIG. 2 is a flowchart of a data uplink transmission abnormal detection method according to some embodiments of the present disclosure.

Reference is made to FIG. 2. FIG. 2 is a flowchart of a data uplink transmission abnormal detection method 200 according to some embodiments of the present disclosure. The embodiments of the present disclosure are not limited thereto.

It should be noted that the data uplink transmission abnormal detection method 200 can be applied to a base station 100 that is the same as or similar to the structure as shown in FIG. 1. To simplify the description below, the embodiments shown in FIG. 1 will be used as an example to describe the method according to an embodiment of the present disclosure. However, the present disclosure is not limited to application to the embodiments shown in FIG. 1.

It should be noted that, in some embodiments, the method may be implemented as a computer program. When the computer program is executed by a computer, an electronic device, or the one or more processor 130 of the core network device 110 of the base station 100, this executing device perform the data uplink transmission abnormal detection method 200. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

Furthermore, is should be noted that, the operations of the operation method mentioned in the present embodiment can be adjusted according to actual needs except for those whose sequences are specifically stated, and can even be executed simultaneously or partially simultaneously.

Furthermore, in different embodiments, these operations may also be adaptively added, replaced, and/or omitted.

Reference is made to FIG. 2. The data uplink transmission abnormal detection method 200 includes the following operations.

In operation S210, several user location data are established according to several radio devices and several user locations.

Figure 3:
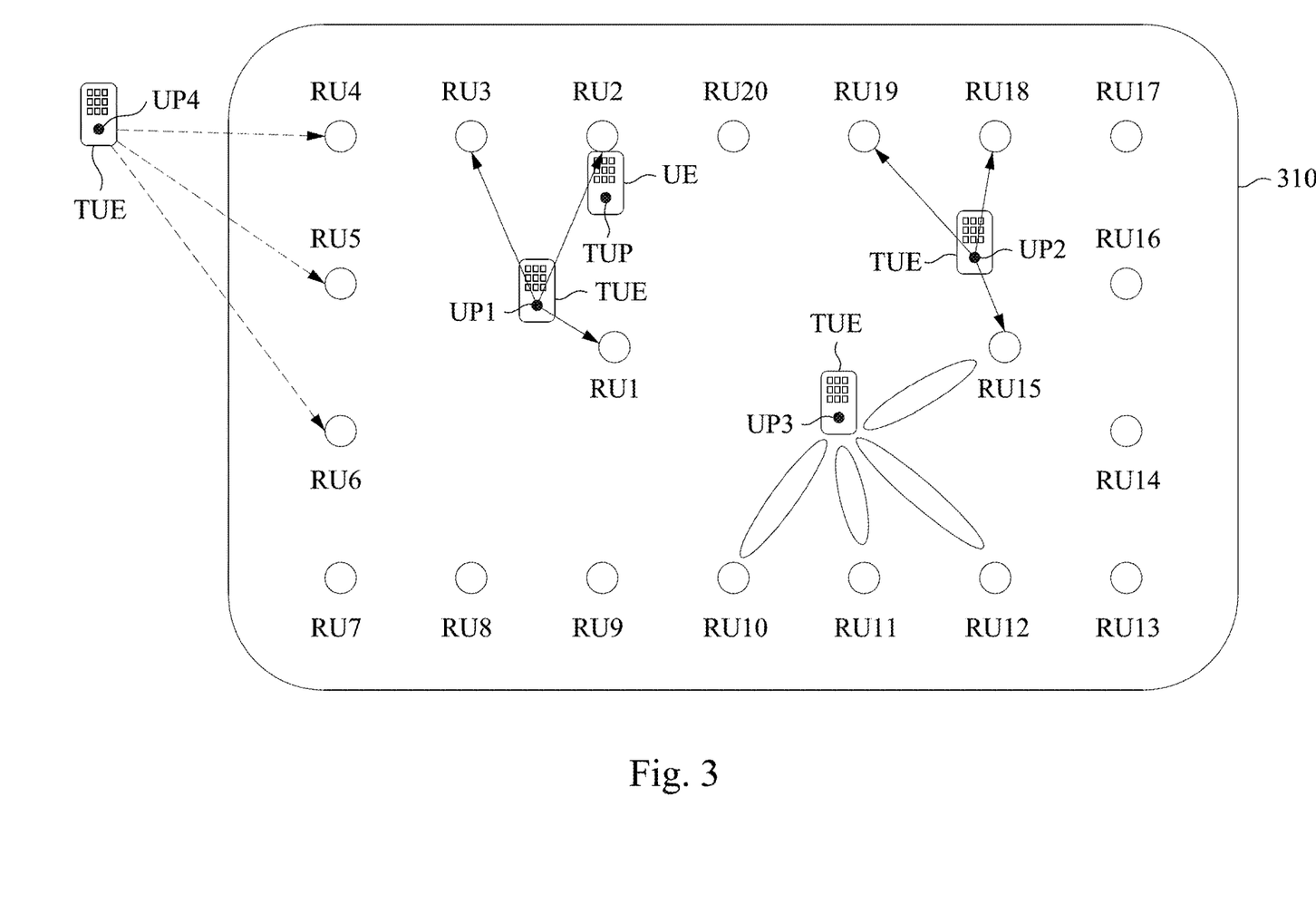
FIG. 3 is a schematic diagram illustrating an operation of the data uplink transmission abnormal detection method in FIG. 2 according to some embodiments of the present disclosure.
Figure 4:
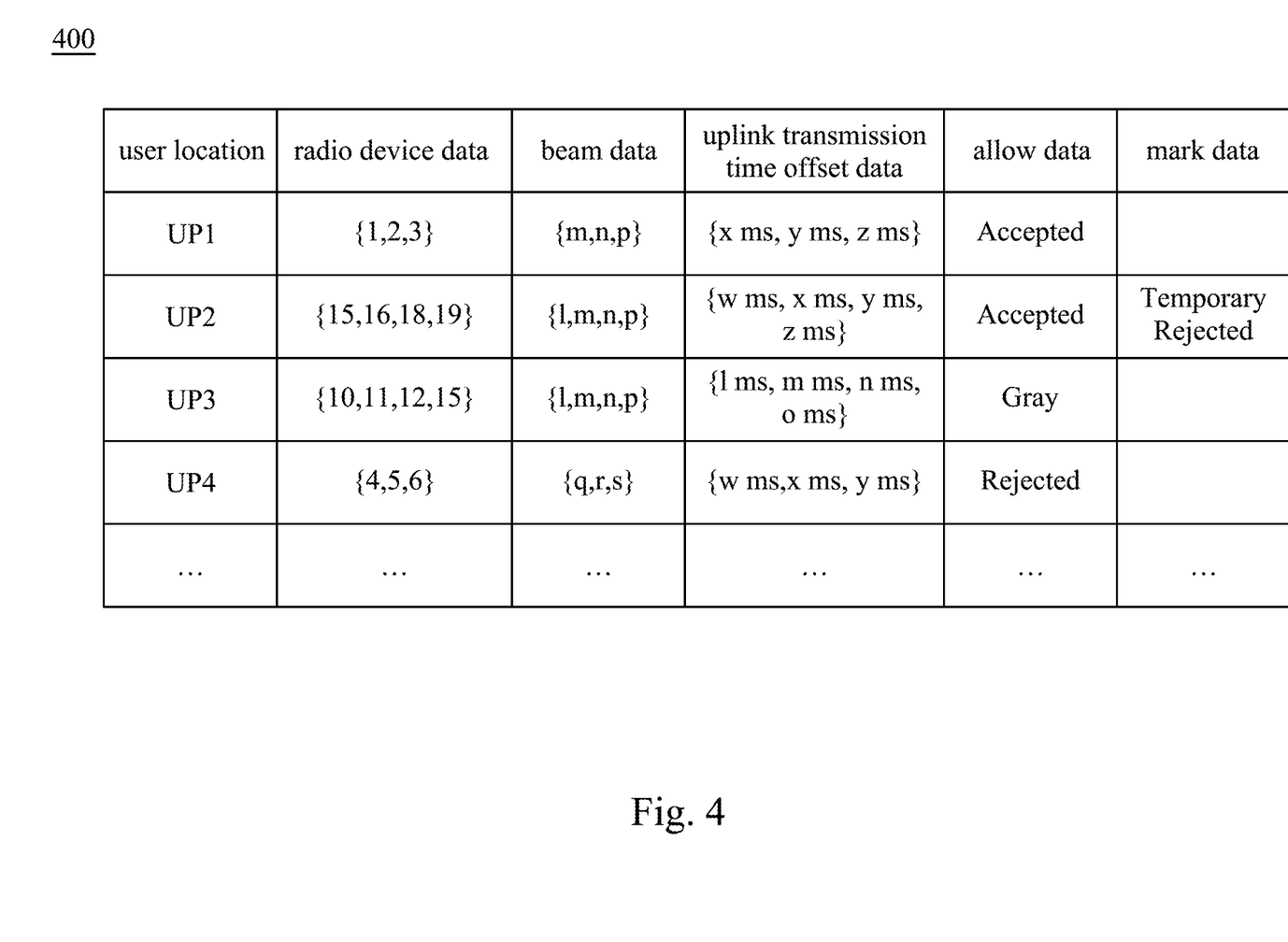
FIG. 4 is a schematic diagram illustrating a user location data according to some embodiments of the present disclosure.

Reference is made to FIG. 1 together. In some embodiments, operation S210 is performed by the processor 130 of the core network device 110 in FIG. 1. Reference is made to FIG. 1, FIG. 3 and FIG. 4 for the detailed operation method of operation S210.

Reference is made to FIG. 3. FIG. 3 is a schematic diagram illustrating an operation of operation S210 in FIG. 2 according to some embodiments of the present disclosure.

As illustrated in FIG. 3. In range 310, several radio devices RU1 to RU20 are established. For ease of illustration, only part of the several radio devices RU1 to RU20 are shown here.

Reference is made to FIG. 4 together. FIG. 4 is a schematic diagram illustrating a user location data 400 according to some embodiments of the present disclosure. As illustrated in FIG. 4, each of the user location data 400 corresponds to one of the user locations UP1 to UP4 in FIG. 3. Each of the user location data 400 includes one of the radio device data, the beam data, the uplink transmission time offset data and the allow data.

The user location data 400 shown in FIG. 4 is the situation shown in FIG. 3, which is obtained after data uplink operations with test device TUE in different user locations, several user location data is generated. In details, the test device TUE performs data uplink transmission operation to the base station 100 shown in FIG. 1 in and around the range 310 to obtain the user location data of each user location.

Reference is made to FIG. 3 and FIG. 4 together. For example, when the test device TUE performs data uplink transmission operation in user location UP1 to uplink data to the base station 100, it is uplink transmission via radio devices RU1, RU2, RU3, which is the radio device data corresponding to the user location UP1.

When the test device TUE performs data uplink transmission operation in user location UP1 to upload data to the base station 100, the uplink transmission between the test device TUE and the radio device RU1 is performed by the beam m, and the uplink transmission between the test device TUE and the radio device RU2 is performed by the beam n. The uplink transmission between the test device TUE and the radio device RU3 are performed by the beam p, which is the beam data corresponding to the user device UP1.

Furthermore, the uplink transmission time offset between the test device TUE and the radio device RU1 is x ms (milliseconds), the uplink transmission time offset between the test device TUE and the radio device RU2 is y ms (milliseconds), the uplink transmission time offset between the test device TUE and the radio device RU3 is z ms (milliseconds). After the processor 130 of the core network device 110 collects the user location data corresponding to the user location UP1, information corresponding to the user location UP1 in the first line of the user location data 400 in FIG. 4 is generated, which is corresponding to the user device UP1 in the uplink transmission time offset data.

By analogy, by performing the data uplink transmission operation of the test device TUE in each of the user locations UP2 to UP4, the user location data corresponding to the user locations UP2 to UP4 can be obtained respectively to generate the content of the user location data 400. It should be noted that, for the convenience of description, only user locations UP1 to UP4 are used here for description. The user locations in the embodiments of the present disclosure are not limited by the above location and quantity.

Reference is made to FIG. 4 again. As illustrated in FIG. 4, each user location data includes the allow data. In some embodiments, when the parameter of the allow data is Accepted, the user device is allowed to perform the data uplink transmission operation. When the parameter of the allow data is Rejected, the user device is not allowed to perform the data uplink transmission operation. When the parameter of the allow data is Gray, the user device is allowed or is not allowed to perform the data uplink transmission operation according to the user setting. The allow data mentioning above is for illustrative purposes only, and the embodiments of the present disclosure are not limited thereto.

The range 310 shown in FIG. 3 can be a factory range. For example, in some embodiments, the range 310 is a range that allows the data uplink transmission operation. In some embodiments, the range of data uplink transmission operation allowed can be further reduced to the range near the antenna of the radio user of the factory machine.

In some embodiments, the allow data of the user location data in FIG. 4 may be set by the user.

In operation S230, a first user location data of several user location data corresponding to a user device is determined according to several user location data and user uplink transmission data uplinked by the user device. Reference is made to FIG. 1 together, in some embodiments, the operation S230 is performed by the processor 130 of the core network device 110 in FIG. 1.

In some embodiments, when a user uses a user device to perform a data uplink transmission operation, the processor 130 of the core network device 110 collects the user uplink transmission data of the user device. The user uplink transmission data includes at least one of radio device data, beam data, and uplink transmission time offset data. Then, the processor 130 of the core network device 110 compares the collected user uplink transmission data with the user location data stored in the memory 150 to determine the user location data corresponding to the user device. In some embodiments, the processor 130 of the core network device 110 determines the user location data closest to the user's uplink transmission data among several user location data, and uses the closest user location data as the one corresponding to the user device user location data.

For example, reference is made to FIG. 3. When the user device UE performs the data uplink transmission operation in the user location TUP, the processor 130 of the core network device 110 collects the user uplink transmission data of the user device UE. The processor 130 of the core network device 110 compares at least one of the radio device data, beam data, and uplink transmission time offset data with the user location data 400 as shown in FIG. 4 according to the user's uplink transmission data. After the comparison, the processor 130 of the core network device 110 determines that the user location data of the user location UP1 is the user location data corresponding to the user device UE.

In operation S250, it is determined whether the user device is allowed to perform a data uplink transmission operation or not according to the first user location data. Reference is made to FIG. 1 together, in some embodiments, operation S250 can be performed by the processor 130 of the core network device 110 as shown in FIG. 1.

For example, in operation S230, the processor 130 of the core network device 110 determines that the user location data of the user location UP1 is the user location data corresponding to the user device UE. Reference is made to FIG. 4 together. In the user location data 400 of FIG. 4, the parameter of the allow data of the user location data corresponding to the user location UP1 is Accepted. Therefore, the processor 130 of the core network device 110 determines that the user device is allowed to perform the data upload operation.

On the contrary, if the processor 130 of the core network device 110 determines that the user location data of the user location UP4 is the user location data corresponding to the user device UE, in the user location data 400 of FIG. 4, the parameter of the allow data of the user location data corresponding to the user location UP4 is Rejected. Therefore, the processor 130 of the core network device 110 determines that the user device is not allowed to perform the data upload operation.

Reference is made to FIG. 1 again. In some embodiments, operation S230 and operation S250 are performed by the filter unit PF of the processor 130.

In some embodiments, the data uplink transmission abnormal detection method further includes determining whether the data uplink transmission operation of the user device is abnormal or not according to the user's uplink transmission data.

Figure 5:
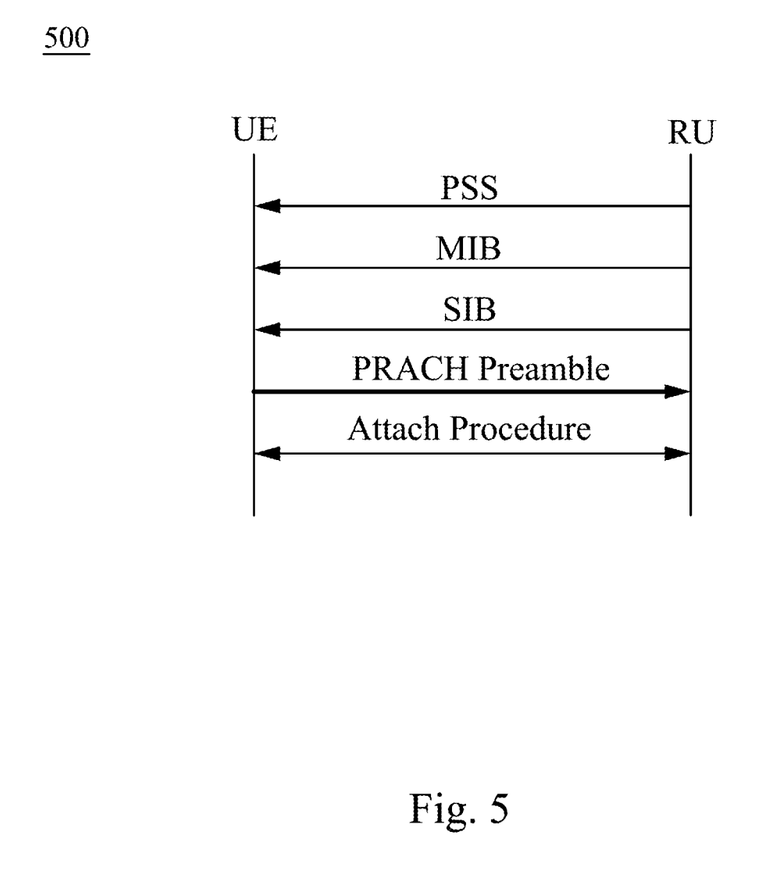
FIG. 5 is a schematic diagram illustrating an uplink transmission data between the user device and the radio device according to some embodiments of the present disclosure.

Reference is made to FIG. 5. FIG. 5 is a schematic diagram illustrating an uplink transmission data 500 between the user device UE and the radio device RU according to some embodiments of the present disclosure. As illustrated in FIG. 5, the transmission data between the user device UE and the radio device RU includes signal PSS, signal MIB, signal SIB, signal PRACH Preamble, and signal Attach Procedure. In the above-mentioned transmission signals, signal PSS, signal MIB, and signal SIB are transmitted from the radio device RU to the user device UE. The signal PRACH Preamble is transmitted by the user device UE to the radio device RU. The signal Attach Procedure is transmitted between the user device UE and the radio device RU.

In some embodiments, the processor 130 of the core network device 110 determines whether the user device UE is located at the Geographical location where the uplink transmission is allowed or not according to the first uplink transmission data (for example, the signal PRACH Preamble in FIG. 5) uplink transmitted by the user device UE to the radio device RU.

In some embodiments, the processor 130 of the core network device 110 determines whether the uplink transmission action of the user device UE is abnormal or not according to the several uplink transmission data transmitted from the user device UE to the radio device RU.

Figure 6:
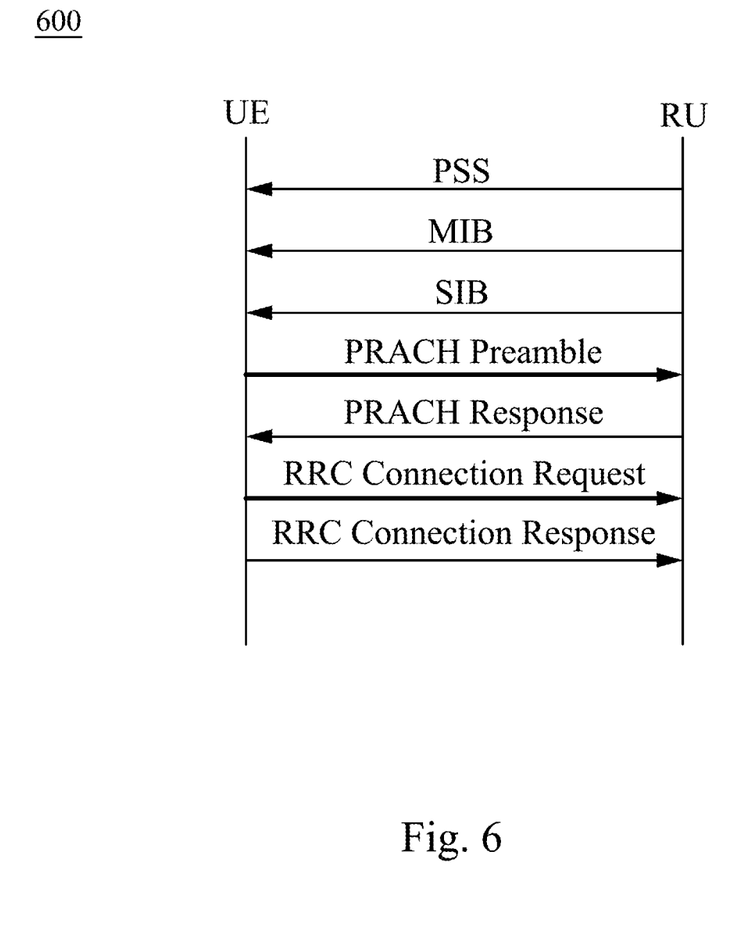
FIG. 6 is a schematic diagram illustrating an uplink transmission data between the user device and the radio device according to some embodiments of the present disclosure.

For example, Reference is made to FIG. 6. FIG. 6 is a schematic diagram illustrating an uplink transmission data 600 between the user device UE and the radio device RU according to some embodiments of the present disclosure. As illustrated in FIG. 6, the transmission data between the user device UE and the radio device RU includes signal PSS, signal MIB, signal SIB, signal PRACH Preamble, signal PRACH Response, signal RRC Connection Request and signal RRC Connection Response.

In the transmission signal mentioning above, signal PSS, signal MIB, signal SIB are transmitted from the radio device RU to the user device UE. The signal PRACH Preamble and signal RRC Connection Request are sent from the user device UE to the radio device RU. The signal PRACH Response and signal RRC Connection Response are transmitted from the radio device RU to the user device UE.

In some embodiments, the processor 130 of the core network device 110 determines whether the uplink transmission action of the user device UE is abnormal or not according to the signal PRACH Preamble and the signal RRC Connection Request uplink transmitting to the radio device RU by the user device UE.

By repeatedly detecting the uplink transmission data, the misjudgment rate of the processor 130 of the core network device 110 can be reduced.

In some embodiments, when the processor 130 of the core network device 110 determines that the data uplink transmission operation of the user device UE is abnormal, the user device UE is not allowed to perform the uplink transmission action.

In some embodiments, when the processor 130 of the core network device 110 determines that the data uplink transmission operation of the user device UE is abnormal, the processor 130 of the core network device 110 marks the user location data corresponding to the user device UE, so that when the processor 130 of the core network device 110 performs the determination of whether the data uplink transmission operation is allowed or not, it is determined that the data uplink transmission operation is not allowed at the user location.

Reference is made to FIG. 4 again. For example, assume that the processor 130 of the core network device 110 determines that the user device UE is corresponding to the user location data of the user location UP2. When the processor 130 of the core network device 110 determines that the data uplink transmission operation of the user device UE is abnormal, the processor 130 of the core network device 110 marks the user location data corresponding to the user location UP2, and the processor 130 sets the mark parameter to be Temporary Rejected, for temporary not allowing the device of user location UP2 to perform the data uplink transmission operation.

In some embodiments, the processor 130 of the core network device 110 changes the allow parameter, so as to not allowing the user device UE to perform the data uplink transmission operation.

In some embodiments, when the processor 130 of the core network device 110 determines that the abnormal action is ended, the processor 130 of the core network device 110 unmarks or changes the allow parameter to allow the user device UE to perform the data uplink transmission operation again.

Reference is made to FIG. 1 again. In some embodiments, the data analysis unit DAF obtains the information uplinked by the user device UE and analyzes whether the data uplink transmission operation of the user device UE is abnormal or not according to the information uplink transmitted by the user. When it is determined that the uplink transmission action of the user device UE is abnormal, the data analysis unit DAF sets the user location data corresponding to the user device UE according to the user uplink transmission data of the user device UE, so that according to the set user location data, the filter unit PF does not allow the user device UE to perform the data uplink transmission operation.

In some embodiments, the processor 130 may be a server or other devices. In some embodiments, the processor 130 may be a server, a circuit, or a central processing unit (central processor unit, CPU), microprocessor (MCU) with functions such as storage, calculation, data reading, receiving signals or messages, and transmitting signals or messages, or other devices with equivalent functions. In some embodiments, the memory 150 may be a component with a storage function or a component with similar functions.

According to the embodiment of the present disclosure, it is understood that the embodiment of the present disclosure is to provide a base station and a data uplink transmission abnormal detection method, so as to avoid system intrusion, and the risk of system intrusion is reduced without increasing the transmission delay. The system side detects the collected mobile terminal device information through the radio devices and determines whether the mobile terminal device is located in the allowed service providing areas or not by the system, and the system determines whether to provide the mobile terminal device service or not. Furthermore, when the system determines that the mobile terminal device has a malicious action, the system side newly adds the malicious terminal location as a prohibited service area and excludes the malicious mobile terminal device.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A base station, comprising:
   a plurality of radio devices; and
   a core network device, connected to the plurality of radio devices, and configured:
   to generate a table of a plurality of mapping entries,
   to create each of the plurality of mapping entries by associating a user location data to correspond to the plurality of radio devices, an allow data, and a user location,
   to determine a first user location data by matching a collected user location data of a user device to one of the plurality of mapping entries,
   to determine whether to allow the user device to perform a data uplink transmission operation or not according to a first allow data of the first user location data;
   to determine the data uplink transmission operation of the user device is abnormal according to a first uplink transmission data uplinked by the user device to one of the plurality of radio devices; and
   to disallow the user device from performing the data uplink transmission operation after determining that the data uplink transmission operation of the user device is abnormal.

2. The base station of claim 1, wherein for each of the plurality of mapping entries, the user location data corresponds to the user location, and the user location data comprises at least one of a radio device data, a beam data, an uplink transmission time offset data and the allow data.

3. The base station of claim 2, wherein when the allow data is a first parameter, the user device is allowed to perform the data uplink transmission operation, when the allow data is a second parameter, the user device is not allowed to perform the data uplink transmission operation, and when the allow data is a third parameter, the user device is allowed or is not allowed to perform the data uplink transmission operation according to a user setting.

4. The base station of claim 1, wherein the first user location data is corresponding to a first user location, wherein the first user location data is obtained after a test device performs the data uplink transmission operation at the first user location.

5. The base station of claim 1, wherein the core network device further comprises:
a filter unit, configured to determine whether to allow the user device to perform the data uplink transmission operation or not.

6. The base station of claim 1, wherein the core network device is further configured to determine whether the data uplink transmission operation of the user device is abnormal or not according to a user uplink transmission data.

7. The base station of claim 6, wherein the core network device further comprises:
a filter unit;
a centralized unit, coupled to the filter unit; and
a data analysis unit, coupled to the centralized unit, configured to obtain the user uplink transmission data through the centralized unit, and to set the allow data of the first user location data according to the user uplink transmission data, so that the filter unit does not allow the user device to perform the data uplink transmission operation according to the allow data of the first user location data.

8. A data uplink transmission abnormal detection method, suitable for a base station, wherein the base station comprises a core network device and a plurality of radio devices, the data uplink transmission abnormal detection method comprises:
generating, by a processor of the core network device, a table of a plurality of mapping entries;
creating, by the processor of the core network device, each of the plurality of mapping entries, comprising:
associating a user location data to correspond to the plurality of radio devices, an allow data, and a user location;
determining, by the processor of the core network device, a first user location data by matching a collected user location data of a user device to one of the plurality of mapping entries; and
determining, by the processor of the core network device, whether to allow the user device to perform a data uplink transmission operation or not according to a first allow data of the first user location data;
determining the data uplink transmission operation of the user device is abnormal according to a first uplink transmission data uplinked by the user device to one of the plurality of radio devices; and
disallowing the user device from performing the data uplink transmission operation after determining that the data uplink transmission operation of the user device is abnormal.

9. The data uplink transmission abnormal detection method of 8, wherein for each of the plurality of mapping entries, the user location data corresponds to the user location, and the user location data comprises at least one of a radio device data, a beam data, an uplink transmission time offset data and the allow data.

10. The data uplink transmission abnormal detection method of 8, wherein the first user location data is corresponding to a first user location, wherein the data uplink transmission abnormal detection method further comprises:
obtaining the first user location data generated when a test device is performing the data uplink transmission operation at the first user location.

11. The data uplink transmission abnormal detection method of 9, wherein when the allow data is a first parameter, the user device is allowed to perform the data uplink transmission operation, when the allow data is a second parameter, the user device is not allowed to perform the data uplink transmission operation, and when the allow data is a third parameter, the user device is allowed or not allowed to perform the data uplink transmission operation according to a user setting.

12. The data uplink transmission abnormal detection method of 8, further comprising:
determining, by a filter unit of the core network device, whether the user device is allowed to perform the data uplink transmission operation or not.

13. The data uplink transmission abnormal detection method of 8, further comprising:
determining whether the data uplink transmission operation of the user device is abnormal or not according to a user uplink transmission data.

14. The data uplink transmission abnormal detection method of 13, further comprising:
obtaining, by a data analysis unit of the core network device, the user uplink transmission data;
setting, by the data analysis unit of the core network device, the allow data of the first user location data according to the user uplink transmission data; and
not allowing, by a filter unit of the core network device, the user device to perform the data uplink transmission operation according to the allow data of the first user location data.

* * * * *